United States Patent Office 3,636,008
Patented Jan. 18, 1972

3,636,008
PROCESS FOR THE PRODUCTION OF AN ANTHRAQUINONE DISPERSE DYE
Eiji Yamada, Ibaragi-shi, Kunimasa Hamaguchi, Takarazuka-shi, and Takashi Akamatsu, Ashiya-shi, Japan, assignors to Sumitomo Chemical Company, Ltd., Osaka, Japan
No Drawing. Filed June 3, 1969, Ser. No. 830,147
Claims priority, application Japan, June 14, 1968, 43/41,270, 43/42,171
Int. Cl. C09b 1/06, 1/50
U.S. Cl. 260—380                                 2 Claims

ABSTRACT OF THE DISCLOSURE

A process for the production of a 1,8-dioxy-4,5-dinitroanthraquinone halide by reacting borate of chrysazin with a nitrating agent in a fuming sulfuric acid medium, successively reacting the resulting mixture containing borate of the nitroanthraquinone with a halogenating agent and recovering a 1,8-dioxy-4,5-dinitroanthraquinone halide according to the conventional procedure; and a process for the production of a 1,8-dioxy-4,5-diaminoanthraquinone halide by reacting the mixture containing borate of the nitroanthraquinone halide obtained according to the above-mentioned procedure, without recovering a 1,8-dioxy-4,5-dinitroanthraquinone halide, with a reducing agent in sulfuric acid medium, wherein the halide means bromide or chloride.

The present invention relates to a novel process for preparing a 1,8-dioxy-4,5-dinitroanthraquinone halide which is useful as an intermediate and a 1,8-dioxy-4,5-diaminoanthraquinone halide which is useful as a disperse dye or an intermediate.

For the preparation of the 1,8-dioxy-4,5-dinitroanthraquinone halide and the 1,8-dioxy-4,5-diaminoanthraquinone halide, there has been known in the Japanese patent publications Nos. 14147/63 and 3942/63 a process which comprises directly nitrating a borate of chrysazin in concentrated sulfuric acid or nitrating 1,8-diphenoxyanthraquinone in concentrated sulfuric acid, hydrolyzing the resultant nitrate in an alkaline solution to separate the intermediate consisting of 1,8-dioxy-4,5-dinitroanthraquinone and then halogenating the intermediate in an alkaline aqueous solvent to obtain the 1,8-dioxy-4,5-dinitroanthraquinone halide, which is, after separating from the reaction mixture, subjected to reduction reaction with grape sugar to obtain the 1,8-dioxy-4,5-diaminoanthraquinone halide. Further, there has been known in the Japanese patent publication No. 9089/57 a process which comprises reducing the separated 1,8-dioxy-4,5-dinitroanthraquinone with sodium sulfide or the like in an aqueous solvent to give 1,8-dioxy-4,5-diaminoanthraquinone and halogenating the 1,8-dioxy-4,5-diaminoanthraquinone in concentrated sulfuric acid or an organic solvent.

However, these conventional processes are complicated in operation and cannot be said to be industrially advantageous because in either case the process involves several steps for the separation of the intermediate in the course of obtaining the objective compound from chrysazin and additionally, since the chemical properties of the solvents used are different from each other, it is impossible to operate all the steps in one and the same reaction vessel and, therefore, a large number of reaction vessels must be provided each of which is of a material suitable for each of the solvents and reagents used.

The present inventors have conducted a lengthy research for a process which enables the aforesaid objective compound to be prepared with industrial advantage and found a surprising fact that, although the halogenation reaction between the borate of 1,8-dioxy-4,5-dinitroanthraquinone and a halogenating agent does not proceed in concentrated sulfuric acid, such halogenation reaction proceeds readily positively in fuming sulfuric acid.

It has been known that 1,8-dioxy-4,5-dinitroanthraquinone could be obtained by forming the borate of chrysazin in concentrated sulfuric acid and directly nitrating the ester with nitric acid. According to said process, however, it is inevitable that a large amount of an undesirable compound substituted with nitro group in the β-position is formed as a result of side reaction. The present inventors have also discovered that such side reaction can be almost completely controlled and 1,8-dioxy-4,5-dinitroanthraquinone with high purity can be obtained by use of fuming sulfuric acid.

Upon developing the above-mentioned two discoveries, the present inventors have accomplished the present process, which is characterized in that the nitration reaction of the first step, the halogenation reaction of the second step and the reduction reaction of the third step may be carried out in a substantially single step.

Thus, the present invention provides a process for preparing a 1,8-dioxy-4,5-dinitroanthraquinone halide which comprises reacting borate of chrysazin with a nitrating agent in a fuming sulfuric acid medium, successively reacting the resulting mixture containing borate of 1,8-dioxy-4,5-dinitroanthraquinone with a halogenating agent and recovering a 1,8 - dioxy-4,5-dinitroanthraquinone halide having the formula,

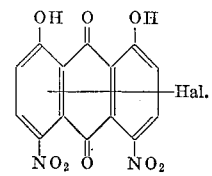

according to the conventional procedure.

The present invention also provides a process for preparing a 1,8 - dioxy-4,5-diaminoanthraquinone halide which comprises reacting borate of chrysazin with a nitrating agent in a fuming sulfuric acid medium, reacting the resulting mixture containing borate of 1,8-dioxy-4,5-dinitroanthraquinone with a halogenating agent, successively reacting the resulting reaction mixture containing borate of 1,8-dioxy-4,5-dinitroanthraquinone halide with a reducing agent in a sulfuric acid medium, and recovering a 1,8-dioxy-4,5-diaminoanthraquinone halide having the formula,

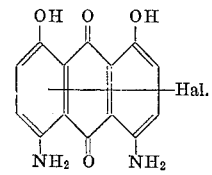

according to the conventional procedure.

In the present invention, the halide means bromide or chloride and a halogen means bromine and chlorine.

The present invention will be well understood by referring to the following detailed illustration.

The fuming sulfuric acid employed as the solvent in the nitration and halogenation reactions is used normally in an amount 5 to 30 times the amount of chrysazin, most preferably in an amount about 10 times the latter. The initial SO₃ concentration of the fuming sulfuric acid is from 10 to 40%, and the best result can be obtained by using a fuming sulfuric acid having the SO₃ concentration of from 20 to 35%.

The initial SO₃ concentration of the fuming sulfuric acid is very important because if a fuming sulfuric acid having an SO₃ concentration of lower than 10% or a concentrated sulfuric acid is used, the concentration of the sulfuric acid at the time of halogenation reaction drops below 100% enabling substantially no halogenation reaction to be undertaken, whereas if the initial SO₃ concentration of the fuming sulfuric acid having and SO₃ concentration of higher than 40% is used, the nitration reaction hardly proceeds.

In the process of this invention, boric acid is essential for the nitration reaction and halogenation reaction. This is because if boric acid is not added to form the borate, an abnormally extensive side reaction takes place in either step of nitration reaction or halogenation reaction, making it difficult to obtain the objective compound. The boric acid is used preferably at the mol ratio of 2 to 3 with respect to the chrysazin.

As the nitrating agent, nitric acid and a mixed acid composed of about 30% of nitric acid and about 70% of anhydrous sulfuric acid may be preferably used, and the amount thereof is preferably the theoretical amount or a slightly excess amount thereof.

The halogenating agent used in the present process includes bromine and chlorine and a catalyst for the halogenation reaction such as iodine may be preferably used.

The reducing agent used in the present process includes zinc powder, stannous chloride, grape sugar and iron powder.

For the process of this invention, more detailed illustration will be given as follows.

Chrysazin and boric acid are respectively added to the fuming sulfuric acid and the mixed acid or nitric acid is dropwise added thereto at a temperature of 0° to 50° C., and the nitration reaction is conducted at the same level of temperature.

After the nitration reaction is over, 0.5 to 2.0 mol ratio of the halogenating agent and preferably a small amount of the halogenation catalyst are further added thereto.

The reaction mixture is heated to a temperature of 30° to 100° C. and kept at the same level of temperature for a sufficient period of time to complete the halogenation reaction. Thus, the borate of 1,8-dioxy-4,5-dinitroanthraquinone halide is obtained. The 1,8-dioxy-4,5-dinitroanthraquinone halide may be easily separated from the reaction system by pouring the reaction mixture into ice water containing sodium bisulfite to hydrolyzing the borate and simultaneously to precipitate a crystal, which is separated by filtration and washed.

For obtaining the 1,8-dioxy-4,5-diaminoanthraquinone halide, after the completion of the nitration and halogenation reactions according to the procedure mentioned above, a sulfuric acid of 30 to 90% in concentration is successively added to the reaction mixture to make the concentration of sulfuric acid in the reaction mixture to 80 to 100%, and thereafter the reducing agent is added thereto while the temperature being kept at 50° to 150° C. After completion of the reaction, the reaction mixture is poured into ice water to precipitate a crystal, which is separated by filtration, washed and dried.

According to the present invention, a compound containing several halogen atoms per mol of 1,8-dioxy-4,5-dinitro, or diaminoanthraquinone at an optional proportion according to the purpose can be obtained more cheaply and positively than by any of the conventional processes. The 1,8-dioxy-4,5-dinitroanthraquinone halide thus obtained is an important compound as an intermediate of various dyes, for instance, by reducing the intermediate by the ordinary method, a blue dye in the present invention can be obtained.

The 1,8-dioxy-4,5-diaminoanthraquinone halide containing 0.5 to 2 halogen atoms may be preferably used as a disperse dye in view of various fastnesses. Furthermore, since the process of this invention involves a minimum side reaction and enables the product to be obtained at a high purity, it is possible to obtain an excellent dye for dyeing an article clear shade with excellent fastnesses and without staining. It is particularly to be noted that the dye obtained according to the present invention which is finely pulverized by a known method together with a dispersing agent, may be advantageously used for dyeing polyester and acetate fibers according to any of the conventional dyeing procedures.

The peculiarity of the present invention will be more clearly understood from the fact that if attempt is made by employing the process of this invention to prepare a 1,5-dioxy-4,8-dinitroanthraquinone halide which is closely analogous to the 1,8-dioxy-4,5-dinitroanthraquinone halide of this invention and is a compound similarly highly valuable as an intermediate of disperse dye, the objective compound cannot be obtained because the modes of reaction in the fuming sulfuric acid are entirely different between the two. Likewise, if attempt is made by employing the process of this invention to prepare a 1,5-dioxy-4,8-diaminoanthraquinone halide which is closely analogous to the 1,8-dioxy-4,5-diaminoanthraquinone halide of this invention and is a compound similarly highly valuable as a disperse dye, the objective compound cannot be obtained for the same reason.

The process of the present invention will be more specifically illustrated by way of examples hereinafter parts and percent in the following examples being by weight.

EXAMPLE 1

31.2 parts of boric acid was added to 500 parts of fuming sulfuric acid having 30% SO₃ concentration and the mixture was allowed to stand for 1 hour at 50° C. 50 parts of chrysazin was added thereto at 35% C. and the mixture was elevated to and maintained for 2 hours at 50° C. Then 98.7 parts of mixed acid containing 26.7% of nitric acid was added to the mixture dropwise at 10° to 15° C. during about 2 hours. Upon completion of the dropping, the mixture was stirred for 15 minutes, and then 41 parts of bromine and 1.3 parts of iodine were added and the mixture was elevated to 50 °C. After maintaining the mixture at 50° C. for 2 hours and at 70° to 75° C. for 6 hours, the mixture was cooled and poured into 4000 parts of ice water containing 100 parts of sodium bisulfite. The precipitate was filtered, washed and dried, whereupon 82.3 parts of 1,8-dioxy-4,5-dinitroanthraquinone bromide was obtained which contained 21.8% of bromine.

EXAMPLE 2

31.2 parts of boric acid was added to 500 parts of fuming sulfuric acid having 28% SO₃ concentration and the mixture was allowed to stand for 1 hour at 50° C.

The mixture was cooled to 40° C. and added with 50 parts of chrysazin at 40° C. After keeping the mixture for 2 hours at 40° to 50° C., 98.7 parts of mixed acid containing 26.7% of nitric acid was dropwise added thereto during about 2 hours at 10° to 15° C.

The reaction mixture was stirred for 30 minutes and thereafter further added with 40 parts of bromine and 1 part of iodine.

After keeping for 2 hours at 50° C., the mixture was further kept for 6 hours at 70° to 75° C.

The resulting mixture was poured into 4000 parts of ice water containing 100 parts of sodium bisulfite thereby to precipitate crystals, which were separated by filtration and washed, Thus, 84.6 parts (conversion to the dry) of 1,8 - dioxy - 4,5 - dinitroanthraquinone bromide was obtained, the bromine content being 23.6%.

EXAMPLE 3

9.38 parts of boric acid was added to 150 parts of fuming sulfuric acid having 28% $SO_3$ concentration and after maintaining the mixture at 50° C., for 1 hour, 15 parts of chrysazin was added thereto at 30° C. The mixture was maintained at 50° C. for 1 hour, and then 29.9 parts of mixed acid containing 26.7% of nitric acid was added dropwise at 10° to 15° C. during 2 hours and the mixture was stirred for 15 minutes at said temperature.

Thereafter, the mixture was elevated to a temperature of 50° C. and treated in the same manner as in Example 1, except that chlorine gas was slowly introduced into the reaction mixture until 5.1 parts of chlorine was absorbed, 21.3 parts of 1,8-dioxy-4,5-dinitroanthraquinone chloride was obtained which contained 10.2% of chlorine.

EXAMPLE 4

31.2 parts of boric acid was added to 500 parts of fuming sulfuric acid having 30% $SO_3$ concentration and after maintaining at 50° C. for 1 hour, the mixture was cooled. 50 parts of chrysazin was added at 35° C. and the mixture was elevated to a temperature of 50° C. and maintained at 35° C. for 2 hours.

Then, 98.7 parts of mixed acid containing 26.7% nitric acid was added dropwise at 10° to 15° C. during about 2 hours aand upon completion of the dropping, the mixture was stirred for 15 minutes. To the mixture were added 41 arts of bromine and 1.3 parts of iodine and after maintaining the mixture at 50° C. for 2 hours and at 70° to 75° C. for 6 hours, 1000 parts of 74% sulfuric acid was added. Thereafter, the mixture was elevated to temperature of 90° C. and 83 parts of iron powder was slowly added thereto at 90° to 100° C. and the mixture was heated at said temperature for about 5 hours. When the reduction of the nitro group into amino group was confirmed by the chromatography, the mixture was cooled and poured into 9000 parts of ice water and successively thereafter heated to and maintained at 50° C. for about 1 hour. By filtering, washing and drying the precipitate, 68.7 parts of 1,8-dioxy-4,5-diaminoanthraquinone bromide containing 22.5% of bromine was obtained (the theoretical bromine content of the monobromide being 22.9%).

EXAMPLE 5

31.2 parts of boric acid was added to 500 parts of fuming sulfuric acid having 28% $SO_3$ concentration and after maintaining at 50° C. for 1 hour, the mixture was cooled. To the mixture was added 50 parts of chrysazin at 40° C. and the mixture was maintained at 40° to 50° C. for 2 hours.

Then, 98.7 parts of mixed acid containing 26.7% of nitric acid was added dropwise at 10° to 15° C. during about 2 hours and thereafter the mixture was stirred for about 30 minutes. 40 parts of bromine and 1 part of iodine were added, and then the mixture was elevated to 50° C. and maintained at said temperature for 2 hours and at 70° to 75° C. for 6 hours. Thereafter, the mixture was poured into 4000 parts of ice water containing 100 parts of sodium bisulfite and the precipitate was filtered and washed.

The yield of the reaction product obtained was 84.6 parts converted to the dry state and the bromine content was 23.6%.

The wet cake thus obtained was suspended in 2000 parts of water and 250 parts of caustic soda and 68 parts of zinc powder were added and the mixture was maintained at 50° C. for 1 hour. Thereafter, 8 parts of zinc powder was further added and the mixture was maintained at 50° C. for 1 hour. After confirming the completion of reduction, the mixture was made strongly acidic by adding hydrochloric acid thereto dropwise and the resultant precipitate was filtered, washed and dried, whereupon 72.6 parts of 1,8-dioxy-4,5-diaminoanthraquinone bromide was obtained. The bromine content of the reduction product was 25.7%. The product was finely pulverized by a known method together with a dispersing agent and the thus obtained powdery dye was used for dying a polyester fiber clear blue shade with excellent fastnesses to light and sublimation.

EXAMPLE 6

9.38 parts of boric acid was added to 150 parts of fuming sulfuric acid having 28% $SO_3$ concentration and after maintaining the mixture at 50° C. for 1 hour, 15 parts of chrysazin was added thereto at 30° C. The mixture was maintained at 50° C. for 1 hour and then 29.9 parts of 26.7% mixed acid was added dropwise at 15° C. during 2 hours.

After stirring the mixture for 15 minutes at said temperature, 12.5 parts of bromine and 0.5 part of iodine were added thereto and the mixture was heated at 50° C. for 2 hours and at 70° to 75° C. for 6 hours. Thereafter, 300 parts of 87% sulfuric acid and 25 parts of iron powder were added and the mixture was heated to and maintained at 100° to 120° C. for several hours until the nitro group was converted to amino group. Then, the reaction liquid was cooled, poured into 5000 parts of ice water, and maintained at 50° C. for 2 hours as it was. By filtering, washing and drying the precipitate, 22.5 parts of 1,8-dioxy - 4,5 - diaminoanthraquinone bromide containing 27.5% of bromine was obtained.

The process described above was repeated, with the exception that instead of adding 12.5 parts of bromine after the nitration reaction, chlorine gas was introduced into the reaction mixture slowly at 50° C. until 5.1 parts of chlorine was absorbed, whereby 18.2 parts of 1,8-dioxy-4,5-diaminoanthraquinone chloride was obtained, the chlorine content of which was 12.1%.

What we claim is:
1. A process for the production of an 1,8-dihydroxy-4,5-dinitroanthraquinone halide, wherein said halide means bromide or chloride, which comprises:
   (1) reacting borate of chrysazin with a nitrating agent selected from the group consisting of nitric acid and a mixed acid consisting of nitric acid and sulfuric acid, in a fuming sulfuric acid medium at a temperature of 0° to 50° C., the amount of said nitrating agent being two mols of slight excess per mol of crysazin, the amount of said medium being 5 to 30 times the amount of crysazin, and the $SO_3$ concentration in said medium being 10 to 40%;
   (2) reacting the resulting reaction mixture containing borate of 1,8-dihydroxy - 4,5 - dinitroanthraquinone with a halogenating agent selected from the group consisting of bromine and chlorine, at a temperature of 30° to 100° C., the amount of said halogenating agent being 0.5 to 2.0 mol per mol of crysazin; and
   (3) pouring the reaction mixture containing borate of 1,8 - dihydroxy - 4,5 - dinitroanthraquinone halide into ice water to recover the 1,8 - dihydroxy - 4,5-dinitroanthraquinone halide by filtration.
2. A process for the production of a 1,8-dihydroxy-4,5-diaminoanthraquinone halide, wherein said halide means bromide or chloride, which comprises:
   (1) reacting borate of chrysazin with a nitrating agent selected from the group consisting of nitric acid and a mixed acid consisting of nitric acid and sulfuric acid, in a fuming sulfuric acid medium at a temperature of 0° to 50° C., the amount of said nitrating agent being two mols or slight excess per mol of crysazin, the amount of said medium being 5 to 30 times the amount of chrysazin, and the $SO_3$ concentration in said medium being 10 to 40%;
   (2) reacting the resulting reaction mixture containing borate of 1,8-dihydroxy - 4,5 - dinitroanthraquinone with a halogenating agent selected from the group consisting of bromine and chlorine, at a temperature of 30° to 100° C., the amount of said halogenating agent being 0.5 to 2.0 mole per mol of chrysazin;

(3) diluting the concentration of sulfuric acid of said medium to 80 to 100% and then reacting the reaction mixture containing the borate of 1,8-dihydroxy-4,5-dinitroanthraquinone halide with a reducing agent selected from the group consisting of zinc powder, stannous chloride, grape sugar and iron powder, at a temperature of 50° to 150° C.;

(4) pouring the reaction mixture containing borate of 1,8-dihydroxy-4,5-diaminoanthraquinone halide into ice water to recover the 1,8-dihydroxy-4,5-diaminoanthraquinone halide by filtration.

References Cited

UNITED STATES PATENTS

| 3,082,218 | 3/1963 | Buxbaum et al. | 260—380 |
| 3,417,090 | 12/1968 | Pelster et al. | 260—288 |

FOREIGN PATENTS

| 787,379 | 12/1957 | Great Britain | 260—380 |
| 914,261 | 1/1963 | Great Britain | 260—383 |
| 1,013,008 | 12/1965 | Great Britain | 260—381 |

LORRAINE A. WEINBERGER, Primary Examiner

R. GERSTL, Assistant Examiner

U.S. Cl. X.R.

8—39, 40; 260—383